United States Patent
Häck et al.

(10) Patent No.: US 10,988,394 B2
(45) Date of Patent: Apr. 27, 2021

(54) COST CONTROL OF WASTEWATER TREATMENT BASED ON REGULATORY PERIOD

(71) Applicant: HACH LANGE GMBH, Düsseldorf (DE)

(72) Inventors: Michael Häck, Bergisch Gladbach (DE); Jens Plumeyer, Cremlingen (DE); Christian Artmann, Gauting (DE)

(73) Assignee: HACH LANGE GMBH, Berlin (DE)

( * ) Notice: Subject to any disclaimer, the term of this patent is extended or adjusted under 35 U.S.C. 154(b) by 946 days.

(21) Appl. No.: 15/528,295

(22) PCT Filed: Nov. 19, 2015

(86) PCT No.: PCT/EP2015/077081
§ 371 (c)(1),
(2) Date: May 19, 2017

(87) PCT Pub. No.: WO2016/079231
PCT Pub. Date: May 26, 2016

(65) Prior Publication Data
US 2017/0313606 A1    Nov. 2, 2017

Related U.S. Application Data

(60) Provisional application No. 62/081,695, filed on Nov. 19, 2014.

(51) Int. Cl.
*C02F 3/02* (2006.01)
*C02F 3/00* (2006.01)
(Continued)

(52) U.S. Cl.
CPC ............ *C02F 3/006* (2013.01); *C02F 3/1278* (2013.01); *G06Q 30/0202* (2013.01);
(Continued)

(58) Field of Classification Search
None
See application file for complete search history.

(56) References Cited

U.S. PATENT DOCUMENTS

| 5,591,010 A * | 1/1997 | Van Zyl | G05D 9/12 |
| | | | 417/12 |
| 2010/0065494 A1 * | 3/2010 | Lemoine | C02F 3/006 |
| | | | 210/614 |

(Continued)

OTHER PUBLICATIONS

International Searching Authority, Notification of Transmittal of the International Search Report and the Written Opinion of the International Searching Authority, or the Declaration, dated Feb. 15, 2016 pp. 13.

*Primary Examiner* — Jan P Mincarelli
(74) *Attorney, Agent, or Firm* — Ference & Associates LLC

(57) ABSTRACT

Techniques for controlled aeration (140) of wastewater (190) include determining a first aeration intensity for a first aeration interval and a different second aeration intensity for a second aeration interval (225) based on a current energy price (215), a predicted energy price (221), and a regulatory surveillance period (201) during which a regulated critical parameter is monitored for regulatory compliance. Wastewater is aerated at the first aeration intensity for the first aeration interval; and at the second aeration intensity for the second aeration interval. The first aeration interval is short compared to the regulatory surveillance period, the second aeration interval is short compared to the regulatory surveillance period and does not overlap the first aeration interval, and the first aeration intensity is less than the second aeration intensity.

16 Claims, 7 Drawing Sheets

(51) Int. Cl.
*C02F 3/12* (2006.01)
*G06Q 30/02* (2012.01)
*G06Q 50/06* (2012.01)

(52) U.S. Cl.
CPC ........ *G06Q 50/06* (2013.01); *C02F 2209/001* (2013.01); *C02F 2209/006* (2013.01); *Y02W 10/10* (2015.05); *Y02W 10/33* (2015.05); *Y02W 10/37* (2015.05)

(56) References Cited

U.S. PATENT DOCUMENTS

| | | | |
|---|---|---|---|
| 2012/0323619 A1* | 12/2012 | Risz | G06Q 30/0206 705/7.11 |
| 2013/0043188 A1* | 2/2013 | Theodoulou | C02F 1/008 210/650 |

* cited by examiner

COST CONTROL OF WASTEWATER TREATMENT BASED ON REGULATORY PERIOD

CROSS-REFERENCE TO RELATED APPLICATIONS

This application claims benefit of Provisional Appln. 62/081,695, filed Nov. 19, 2014, the entire contents of which are hereby incorporated by reference as if fully set forth herein, under 35 U.S.C. § 119.

BACKGROUND

Wastewater treatment is the process of removing contaminants from wastewater, including household sewage, industrial waste and runoff. Wastewater treatment includes physical, chemical, and biological processes to remove physical, chemical and biological contaminants. The objective of wastewater treatment is to produce an environmentally safe fluid waste stream (or treated effluent called eluent) and a solid waste (or treated sludge) suitable for disposal or reuse (usually as farm fertilizer). With suitable technology, it is possible to re-use treated sewage effluent for drinking water, although this is usually only done in places with limited water supplies. A step often included in the process is aeration, which serves to increase the oxygen content in the wastewater. The increased oxygen promotes biological oxidation and nitrification, and causes the organic solids to be converted into coagulated suspended mass, which is heavier and bulkier, and can settle to the bottom of a tank.

Standards for wastewater eluent are often dictated by a regulation issued by a government body (called a regulatory authority, herein) with authority to regulate wastewater in the locale in the jurisdiction of the government. A regulated critical parameter (also called a consent parameter) is a property of the eluent, which is required to be at or better than some limiting value established by an applicable government regulation imposed by the regulatory authority. The limiting value applies to an average value over a surveillance period (e.g., 24 hours); and the surveillance period is often also dictated by the regulations. A wastewater treatment facility in the locale is often required to report average values of the consent parameter for each surveillance period. Fines or other costs are imposed by the regulatory authority against a facility based on the number of surveillance periods for which the value of the critical parameter is worse than the limiting value over a long term, such as one year, called herein a regulatory long term, and such violations in previous regulatory long terms. It is also often the practice that a representative of the regulatory authority visits the wastewater treatment facility (e.g., five or six times over the regulatory long term) to calibrate the determination of the average values of the consent parameter for one or more surveillance periods.

Real time control concepts for aeration processes on waste water treatment plants are typically designed to maintain a set point better than a limiting value for each of one or more consent parameters, such as total nitrogen (TN), total organic carbon (TOC) or ammonium ($NH_4$—N), or some combination. The control algorithms often are based on actual measured values for analytical parameters (also called operational parameters), such as dissolved oxygen (DO), ammonium, mixed liquor suspended solids (MLSS), temperature (T), chemical oxygen demand (COD), air flow rate and wastewater load flow rate. Such measurements are sensed on a short sampling period, such as one measurement every one or more minutes. Based on those actual measured data and a known DO concentration response for a particular system, an aeration intensity is calculated which is required to meet any defined or fixed set point or limiting values for the critical process parameters in the eluent.

SUMMARY

Some control systems for wastewater treatment consider current and expected energy prices in scheduling periods of aeration. However, some of these approaches can cause a treatment system to miss or violate regulatory requirements for target purification at particular monitoring intervals. In the work presented here, a need was recognized to both minimize energy prices and meet regulatory targets. Thus, techniques are provided for control of wastewater treatment based on a regulatory period, such as the surveillance period.

Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. In addition, the serial adjectives "first," "second," "third," etc., are used to distinguish items, elements or steps (including intervals of time) in the order introduced, and not to imply a temporal sequence, unless otherwise indicated. Thus, a first time interval can occur before or after or overlapping a second time interval.

In a first set of embodiments, a method includes determining a first aeration intensity for a first aeration interval and a different second aeration intensity for a second aeration interval based on a current energy price, a predicted energy price, and a regulatory surveillance period during which a regulated critical parameter is monitored for regulatory compliance. The method also includes aerating wastewater at the first aeration intensity for the first aeration interval; and, aerating wastewater at the second aeration intensity for the second aeration interval. The first aeration interval is short compared to the regulatory surveillance period. Furthermore, the second aeration interval is also short compared to the regulatory surveillance period and does not overlap the first aeration interval, and the first aeration intensity is less than the second aeration intensity.

In some embodiments of the first set, the first aeration interval is a time interval associated with an actual or predicted first energy price; and, the second aeration interval is a time interval associated with a different actual or predicted second energy price that is less than the first energy price.

In some embodiments of the first set, determining the first aeration intensity and the different second aeration intensity is further based on one or more of historical plant purification data that indicates values for the treated effluent properties associated with aeration intensity; a monitoring procedure defined by the regulatory authority for determining any defined or fixed limiting values for values of the treated effluent properties; and, aeration intensity calculated to meet the defined or fixed limiting values for the treated effluent properties.

In some embodiments of the first set, determining the first aeration intensity and the different second aeration intensity is based further on a weighting factor that accounts for site specific conditions between energy usage and purification performance.

In some embodiments of the first set, determining the first aeration intensity for the first aeration interval and the different second aeration intensity for the second aeration interval is repeated continuously, which means at a temporal period short compared to a time horizon to an end of a current regulatory surveillance period.

In other embodiments, a computer-readable medium or apparatus or system is configured to perform one or more steps of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for control of wastewater treatment based on regulatory period. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments are described below in the context of target values for Ammonia-Nitrogen ($NH_4$—N) as the consent parameter in eluent, and the context of aeration using atmospheric air for treatment of nutrients in wastewater. However, the invention is not limited to this context. In other embodiments, target values for other properties of the treated effluent are monitored, such as total chemical oxygen demand (COD), or total nitrogen (TN), or total organic carbon (TOC); and, aeration is performed with other mixtures of gases, such as pure oxygen, for treatment of other waste products, such as wastewater with industrial byproducts.

1. Overview

Figure 1:
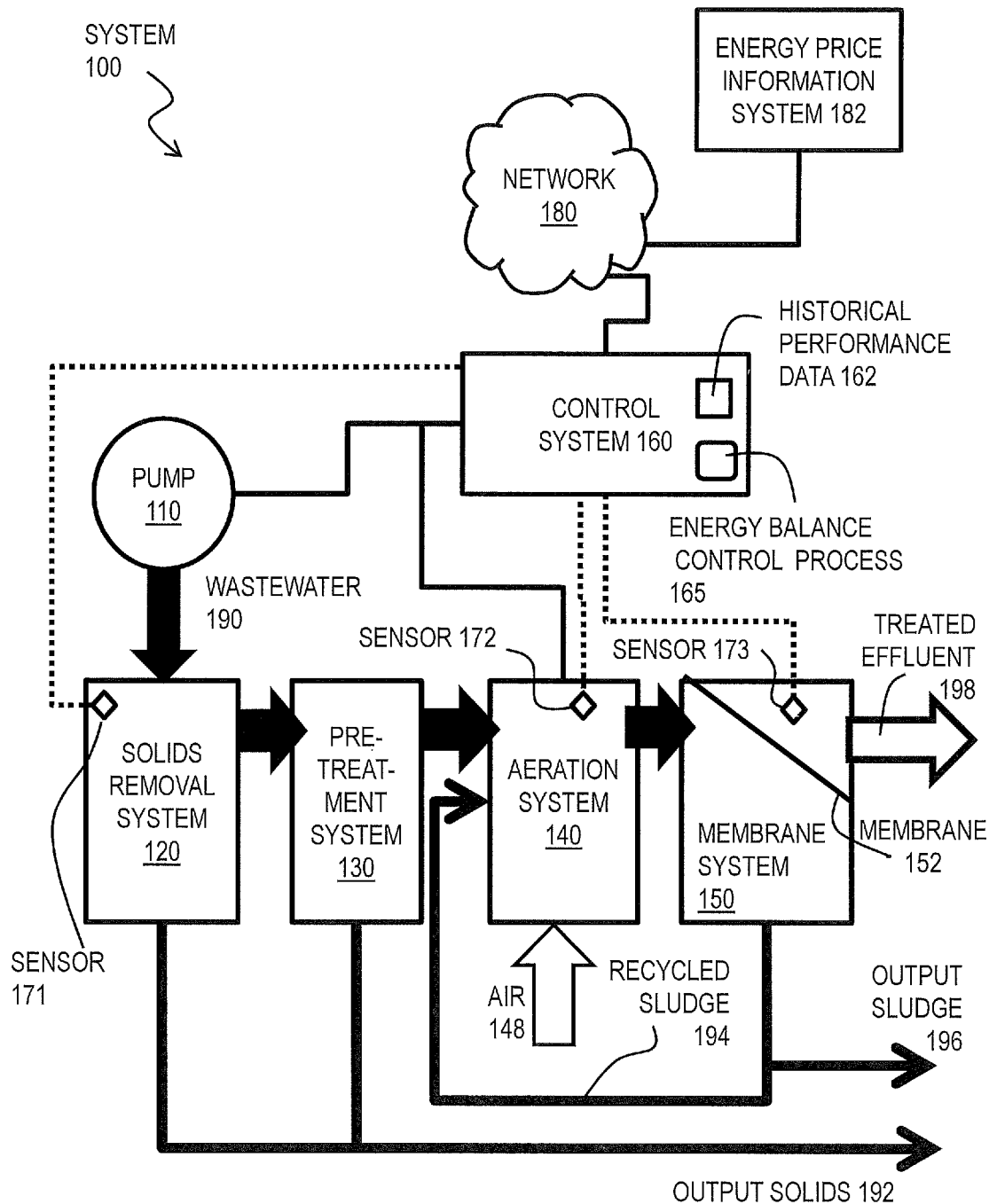
FIG. 1 is a block diagram that illustrates an example wastewater treatment system, according to one embodiment.

FIG. 1 is a block diagram that illustrates an example wastewater treatment system 100, according to one embodiment. Although processes, equipment, and data structures are depicted in FIG. 1 as integral blocks in a particular arrangement for purposes of illustration, in other embodiments one or more processes or data structures or equipment, or portions thereof, are arranged in a different manner, on the same or different equipment, or are omitted, or one or more different processes or data structures or equipment are included.

In the illustrated embodiment, the wastewater treatment system 100 includes several other component systems, including a solids removal system 120, a pre-treatment system 130, an aeration system 140, a membrane system 150, and a control system 160, such as a Supervisory Control And Data Acquisition (SCADA) system. Wastewater 190 is introduced and moved through the system 100, often at a controlled rate propelled by one or more pumps, such as pump 110. The output of the system is a treated effluent 198, as well as sludge 196 or solids 192 or both.

The solids removal system 120 is included to filter out solids that are inert or otherwise not treated by the system 100, such as gravel, plastics, metal or other debris carried with the wastewater. This system typically includes one or more sieves of various gauges. Often called "primary treatment" or "mechanical treatment," the solids removal system 120 is designed to remove gross, suspended and floating solids from raw sewage. It includes screening to trap solid objects and sedimentation by gravity to remove suspended solids. Any solids removal system known in the art may be used as system 120.

The pre-treatment system 130, often also included in the term "mechanical treatment," is included to perform other functions that precede in time the use of biological organisms to process organic materials. Such functions of the pre-treatment system 130 include the use of chemicals to accelerate the sedimentation process. This system can reduce biodegradable organics of the incoming wastewater by 20-30% and the total suspended solids by some 50-60%. The solids removed by steps 120 and 130 are called output solids 192. The residual liquid is called settled sludge.

The aeration system 140 exposes the sludge to oxygen, alone or in some combination with other gases, and, if the plant is designed accordingly, removes the dissolved organic matter that escapes primary treatment e.g., converts ammonia into nitrate or removes the nitrogen. This function is achieved by microbes. The aerated, microbe-containing sludge is often called activated sludge. In the illustrated embodiment, the aeration system 140 introduces air 148 with atmospheric concentrations of oxygen, nitrogen and carbon dioxide into the sludge, because air 148 is cheap and readily available. Any aeration system can be used, from systems that bubble the gas up through the sludge from bottom to top, to systems that churn the sludge with large propellers to constantly change the sludge exposed at the surface, to systems that spew the sludge as fountains into the air above the system, thus exposing millions of droplets with large cumulative surface area to the atmosphere.

The activated sludge is moved to a post aeration system, such as one or more settlement tanks with or without a membrane. The membrane 152 is used to pass only small molecules, such as water, oxygen and carbon dioxide as treated effluent (eluent) 198, while leaving the larger organic molecules in the sludge. In the illustrated embodiment, the post-aeration system is called a membrane system 150 and includes a membrane 152 to pass the water and other small molecules. In more conventional embodiments, final clarification tanks are used instead of the membrane system 150. The remaining sludge is then either reintroduced into the aeration system 140 as recycled sludge 194, or removed from the system as output sludge 196. The output of the system is eluent 198 represented by a hollow arrow in the diagram.

About 85% of the suspended solids and biodegradable organics can be removed by a well running plant with such aeration and final clarification systems, often called secondary treatment. Secondary treatment technologies include the basic activated sludge process, the variants of pond and constructed wetland systems, trickling filters and other forms of treatment which use biological activity to break down organic matter.

In some embodiments, other systems are included to perform so-called tertiary treatment. Tertiary treatment can remove more than 99% of all the impurities from sewage, producing an eluent of almost drinking-water quality. An example of a typical tertiary treatment process is the modification of a conventional secondary treatment plant to remove additional phosphorus and nitrogen. Disinfection, typically with chlorine or ultraviolet radiation, can be a final step before discharge of the eluent. However, some environmental authorities are concerned that chlorine residuals in the eluent can be a problem, and regulatory requirements have moved away from chlorine disinfection. Disinfection is frequently built into treatment plant design, but not always effectively practiced, because of the high cost of chlorine, or the reduced effectiveness of ultraviolet radiation where the water is not sufficiently clear or free of particles.

Wastewater treatment plants are often the largest single point energy consumers in a municipality. Also industrial waste water treatment plants contribute significantly to energy consumption. For example, 60% of the entire energy consumed on a biological wastewater treatment plant is dedicated to aeration. With energy price (cost per unit energy) a strong function of time for many commercial users, it becomes advantageous to schedule aeration or increase aeration rate (also called herein aeration intensity) during times of low actual or expected energy prices, and to suspend or reduce aeration intensity during periods of high actual or expected energy prices. Aeration intensity is defined as the work done (energy) per unit time to aerate the activated sludge in order to accelerate or maintain biological purification processes. A parameter indicating the aeration intensity is the air flow provided to one or more aeration lanes by a set of one or more blowers, each of which is operated at a certain number of revolutions per second (rps in Hertz). The greater the rps setting, the larger the energy usage by the set of one or more blowers. Thus the unit of aeration intensity is the same as the units of energy consumption, energy (work) per unit time, which is power, measured in watts. Energy pricing is often expressed as cost per unit energy, e.g., cost per kilowatt-hour (KWH), where a kilowatt, KW, is $10^3$ watts.

Figure 4:
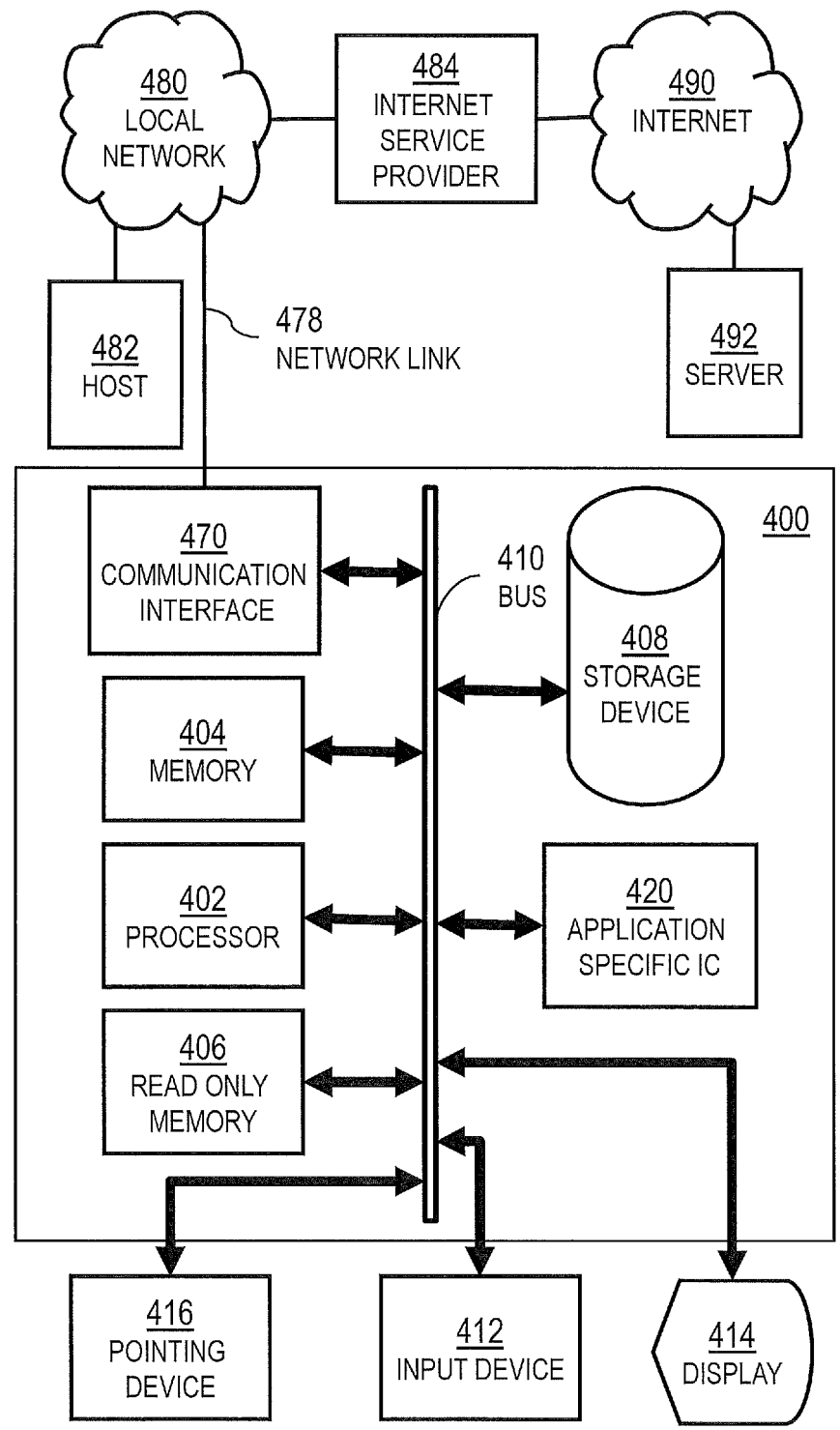
FIG. 4 is a block diagram that illustrates a computer system upon which an embodiment of the invention may be implemented.

The wastewater treatment system 100 is controlled by a control system 160, which determines the rate at which the system is operated. The control system is often implemented on a computer system, as depicted in FIG. 4, and described in more detail below with reference to that figure, or a chip set, depicted in FIG. 5, and also described in more detail below.

The control system 160 controls various component systems of the treatment system 100, such as pump 110 and aeration system 140. This control is indicated by solid lines representing wired or wireless communication channels that convey commands from the control system 160 to the connected component system. In some embodiments, the control system receives data from one or more sensors that detect the state of the component systems or the liquid being operated upon, such as sensor set 171, sensor set 172, sensor set 173, among others, not shown, collectively referenced hereinafter as sensors 170. The data is received from the sensor of a sensor set, either unsolicited or in response to a request for data, through one or more wired or wireless communication channels represented by dotted lines. For example, measurements of TN or TOC, or some combination, in the treated effluent 198 is determined by sensor set 173 of one or more sensors. In an example embodiment, measurements of Ammonium or DO or T, or MLSS, or some combination, in the aeration system are determined by sensor set 172 of one or more sensors. In some example embodiments, measurements of TN, or TOC, or T or MLSS, or some combination, in the entering wastewater 190 is determined by sensor set 171 of one or more sensors.

In some embodiments, the wastewater treatment system 100 is controlled to reduce energy costs by reducing aeration during time intervals of low inflow load 190 (called low water pollution) and increasing aeration during time intervals of high inflow load 190 (called high water pollution), all while meeting regulatory targets for treated effluent, e.g., by achieving a fixed or dynamic set point value at or below a regulatory limiting value. To simply reduce the aeration intensity in high price energy periods is not the way forward, as this in general has an immediate negative impact on purification performance which also introduces costs, such as fines for failing to meet purification performance levels (e.g., failure to meet limiting values for consent parameters). However, depending on the way a plant is monitored by the authority (based on spot sample, 24 hour-mixing sample, or even annual averaging) a continuously controlled performance reduction for a limited period of time can be acceptable, as this will not harm the long term purification capability and has only a minor impact on annual or daily overall plant compliance.

Note that a set point or limiting value, for a consent parameter or an operational parameter, can be a minimum allowed value that could be exceeded but should not be submerged (such as an oxygen level), or can be a maximum allowed value that should not be exceed (e.g., total nitrogen). To avoid confusion about whether the set point or limiting value is a minimum allowed value or maximum allowed value, an operational or performance level will be said to be better than the set point or limiting value if it is above a minimum allowed set point or limiting value, or below a maximum allowed set point or limiting value. Similarly an operational or performance level will be said to be worse than the set point or limiting value if it is below the minimum allowed value, or above a maximum allowed value. Fines can be assessed against a facility if a performance level for a critical parameter is worse than the limiting value for one or more events during a surveillance period. In some embodiments, performance level is a combination of two or more consent parameters with corresponding limiting values.

In the illustrated embodiment, the control system 160 includes historical performance data 162, such a computer-readable memory configured to store data that indicates previous vales of regulated properties of treated effluent (e.g., actual values of effluent TN or Ammonium or TOC, or some combination), for actual measured values (e.g., of DO, MLSS, T) in the incoming wastewater or aeration pools, and actual aeration intensity. Historical data also indicates historical load data as a function of time or weather conditions or some combination, and historical compliance, such as the number of reported violations in any regulatory long term. A regulatory long term is the time interval including multiple plant surveillance periods over which plant performance is considered, and is often one year.

In the illustrated embodiment, the control system also includes an energy balance control process 165 that controls the system 100 based on the actual and expected energy prices and the costs of non-compliance with regulatory requirements. The actual and expected energy prices are determined by obtaining energy price information from an energy price information source, e.g., at one or more computer systems 182 with information relevant to current or future energy prices. Typically the systems 182 are accessible on a local or wide area network 180, such as the Internet. In some embodiments, the process 165 also takes into account information determined from some or all of the historical performance data 162.

Figure 2A:
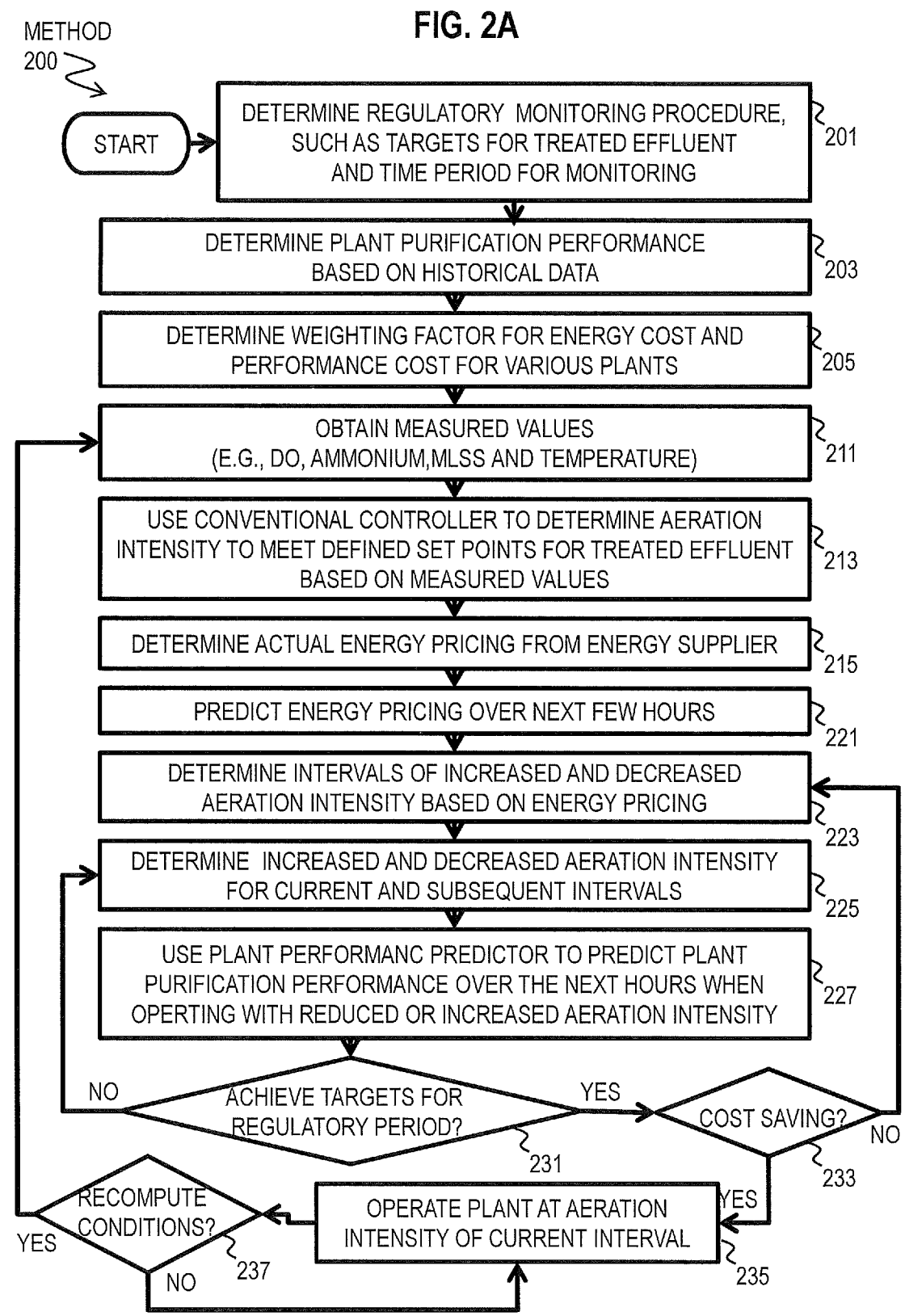
FIG. 2A is a block diagram that illustrates an example wastewater treatment method, according to one embodiment.

FIG. 2A is a block diagram that illustrates an example wastewater treatment method, according to one embodiment. Although steps are depicted in FIG. 2A, and subsequent flow diagram FIG. 2B, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 201, the regulatory monitoring procedures are determined. This step includes listing (e.g., storing on a computer-readable medium in or accessible to the control system 160) the consent parameters to be measured to comply with the regulations, the temporal sampling and statistics required by the regulations for measurements of values of those parameters, and the upper or lower compliance thresholds (limiting values) for the measured value for each parameter. Step 201 is updated as regulations change. For example during step 201 it is determined that the annual average value of TN measured in a daily averaged sample must be below a limiting value indicated by TNmax; and this information is stored in a computer-readable memory that is part of the control system 160.

In step 203 plant purification performance is determined based on historical data, e.g., historical data 162. Plant performance data includes measured values of consent parameters in relation to limiting values. In some embodiments, this data includes historical reported plant performance during a current regulatory long term, including number of reported violations on effluent water quality. In some embodiments, the historical plant performance costs (e.g., cost of deviations from target effluent quality as indicated by the limiting values of consent parameters or set points for those parameters) is also determined during step 203.

In step 205 weighting factors are determined for the relative contribution to total cost of energy costs and the cost of deviating from target effluent quality targets, as determined from the historical data. In some embodiments, these weighting factors are site/plant specific, as determined by the historical data.

In step 211, measured values are obtained, e.g., from sensor set 170, such as sensor sets 171 and 172. For example, the concentrations of DO, Ammonium, MLSS and T for the liquid in the aeration system 140 are determined based one or more sensors, such as sensor set 172.

In step 213 the aeration intensity to meet the regulatory requirements are determined. Many treatment plants have a control algorithm to provide this information, and any of these can be used. In general, real time control concepts for aeration processes on wastewater treatment plants are designed to always maintain a target effluent value (called a set point) that is better than the limiting value for each of one or more consent parameters like total Nitrogen (TN) and Ammonium (NH4—N). The algorithms are based on actual analytical (operational) parameter like DO, $NH_4$—N, MLSS, T, and flow data. Based on those actual input data, a DO concentration response is determined. An aeration intensity is calculated which is associated with a set point that is better than the defined and fixed limiting values for the $NH_4$—N or TOC or TN concentration. For example, a plant is required to meet a certain limiting value on a certain effluent water quality parameter (e.g. NH4—N<2 mg/l in a daily average sample) with fines imposed if too often exceeded (e.g., up to 5 violation across a year are accepted). The "conventional controller" has got a fixed set point for that effluent water quality parameter (e.g. NH4—N_setpoint=1.0 mg/l) that is better than the limiting value. The actual variable which is calculated by that "conventional controller" is the aeration intensity. For example, if the continuously measured water quality parameter increases, the aeration intensity is automatically increased to ensure the measured NH4—N concentration is at the set point, and therefore at or below the limiting value. This results in higher energy consumption. If the load is low, then the aeration intensity is decreased. This results in a lower energy consumption. In this "conventional controller" neither actual energy prices nor historical plant performance data are considered in determining the aeration intensity or in selecting the set point for the quality parameter. In this state of the art concept, the setpoint is always fixed (e.g. NH4—N_setpoint=1.0 mg/l). The controller is always acting in the same way.

The aeration intensity is related to blower configuration and resulting air supply rate. This algorithm is called herein a conventional control algorithm. Conventional control strategies include the adjustment of aeration intensity based on the measurement of water quality in the effluent of an aeration tank. This can be done automatically or based on laboratory data. The conventional control algorithms do not include energy prices or regulatory procedures. The process or device that uses the conventional algorithm is called a conventional controller.

In step 215 the actual current energy price is determined. Typically, this information is available as data from the energy supplier, e.g., in a notice message delivered from the energy supplier system 182, or upon a call to the system 182.

In step 221 the expected energy price is determined for the next few hours, at least, and, in some embodiments, also for the next few days or weeks. In some embodiments this information is available as data from the energy supplier, e.g., in a notice message delivered from the energy supplier system 182, or in response to a request data message sent to the system 182. In some embodiments, the energy price change is predicted based on weather forecasts or the current season or time of day, or some combination. For example, if the treatment plant or energy supplier has solar or wind power, the weather forecast can be used to predict the amount of own power generated, or power available, which will reduce the amount of energy purchased or the price of the energy purchased from the power supplier. Similarly, weather can influence the demand by other users, such as air conditioning users, which can also affect the price in predictable ways.

Thus, with ongoing changes in the energy market and the movement towards renewable and green energy, availability of energy is more and more influenced by non-controllable conditions like wind or sunshine. This movement impacts energy supply contracts for industrial customers with large energy consuming devices, such as wastewater treatment plants. Financially attractive contracts can include variable energy pricing over a day, within hours or even within minutes. Prices might even become negative if energy is available in excess, e.g., from solar and wind generating plants associated with the wastewater treatment facility or municipality.

In step 223, one or more intervals of increased or decreased aeration intensity are defined based at least in part on the actual and predicted energy pricing. To prevent violating regulatory requirements, the time intervals are short relative to the regulatory period. For example, if the regulatory period is a 24 hour average purification performance value (e.g., TN below TNmax) the time intervals of changed aeration intensity are short relative to 24 hours. In some embodiments, the interval is a time interval (called a time horizon herein) remaining in a current regulatory surveillance period.

In step 225, the aeration intensities (e.g., blower configuration and resulting air supply rate) are determined for the one or more time intervals, such as the time horizon. Blower configuration includes blower revolution rate and associated power usage and resulting air flow rate. For example, in some embodiments, if the current interval, extending from now until some end time, e.g., two hours, is an interval of reduced energy pricing and increased load, then aeration intensity is increased. The amount of the increase is determined based on one or more factors, alone or in some combination, such as: the wastewater load; the change in purification expected by the change in aeration intensity; or, the duration and aeration intensity of the preceding or following time period of increased energy pricing and lower aeration intensity that has to be made up in the current interval.

In some embodiments, the second aeration intensity in a second interval is based on a dynamic set point value for the consent parameter better than the usual set point value; and the first aeration intensity in a first interval is based on a value for the consent parameter worse than the usual set point value. For example, if the limiting value for ammonia is 2 mg/l and the usual set point value is 1.0 mg/l, then in periods of low energy cost (second interval) the aeration intensity is increased to bring the ammonia values in the eluent to a better set point of 0.5 mg/l, and in periods of high energy cost (first interval) the aeration intensity is decreased to allow the ammonia values in the eluent to reach a worse set point of 3.0 mg/l. In some embodiments, the worse set point is limited to the same amount of time or eluent volume that the better set point was used. In some embodiments, the better set point is used for a certain period of time in order to build up a buffer for when the worse set point is used. This can also be done on a short term, e.g. if for 5 PM to 8 PM, high energy prices are predicted, then from 2 PM to 3 PM, the NH4—N_set point can be decreased down to 0.1 mg/l in order to build up a buffer for the time between 5 PM to 8 PM, when the set point is at 0.3 mg/l. These changes in set point, in these embodiments, are determined in order to minimize the total cost calculated by cost for energy and cost for non-compliant performance weighted by the weighting factors described above.

In some embodiments, the intensity for the one or more time intervals is a guess that is refined in a computational loop comprising step 225, 227 and 231. In step 227, a plant performance predictor is used to predict plant purification performance (e.g., the values of regulatory critical parameters reached in the eluent) over the one or more time intervals when operating at the aeration intensities different from that determined in step 213 by the conventional algorithm. In step 231, it is determined whether the computed aeration intensities for the one or more intervals will achieve compliance (be at or better than the limiting values for the consent parameters) when averaged over the surveillance period. In some embodiments, this measure of compliance is assigned a purification performance cost (such as zero for compliant performance and an expected fine for non-compliant performance). If not, control passes back to step 225 to change the aeration intensities. If compliance or near compliance is predicted, then control passes to step 233. In step 233, it is determined whether cost savings is achieved or predicted, or, instead, costs increase because aeration has to be increased too much in some intervals or the cost of non-compliance is too great. If total costs are not saved, control passes back to step 223 to determine different intervals of time for changes in aeration, e.g., shorter intervals of increased aeration. If it is determined that costs are saved, then control passes to step 235.

In step 235, the wastewater treatment plant is operated at the computed aeration intensity for the current time interval. For example, the control system 160 controls the aeration system 140 to operate at the lower or higher or conventional aeration rate.

In some embodiments, the computation of the current time interval and the costs are performed again on a time scale short compared to the computed interval, e.g., as soon as the operation starts, or a few minutes later. In these embodiments, control passes to step 237 to determine if conditions are satisfied for re-computing the time intervals and aeration rates. If not, control passes back to step 235 to continue to operate at the current aeration intensity during the previously computed interval. If conditions to re-compute are satisfied, then control returns to step 211, and following step, to get new measured values and get new actual and predicted energy prices and actual and predicted wastewater loads and do the computation of intervals and intensities again.

Thus, in the illustrated embodiment, the conventional control algorithm is extended by a plant performance predictor that predicts plant purification performance over the next hours when operating the plant with reduced or increased aeration intensity. Based on the prediction on purification performance, and the output of the conventional controller, and the actual energy pricing, and a prediction of energy pricing over the next hours, and historical plant purification performance data, and the monitoring procedure defined by the authority, an overall cost per purification performance function is continuously evaluated in order to determinate the financially most efficient aeration intensity for the next time period. To balance site specific conditions between cost and purification performance, a site specific weighting factor is included in the energy cost/purification performance cost function in some embodiments. An advantage over the situation before, is that actual and predicted energy prices as well as data on historical plant purification performance are taken into consideration when calculating the aeration intensity. This helps to operate the plant more efficiently, regarding purification performance and energy cost, while still meeting regulatory targets in the long term.

2. Example Embodiments

Figure 2B:
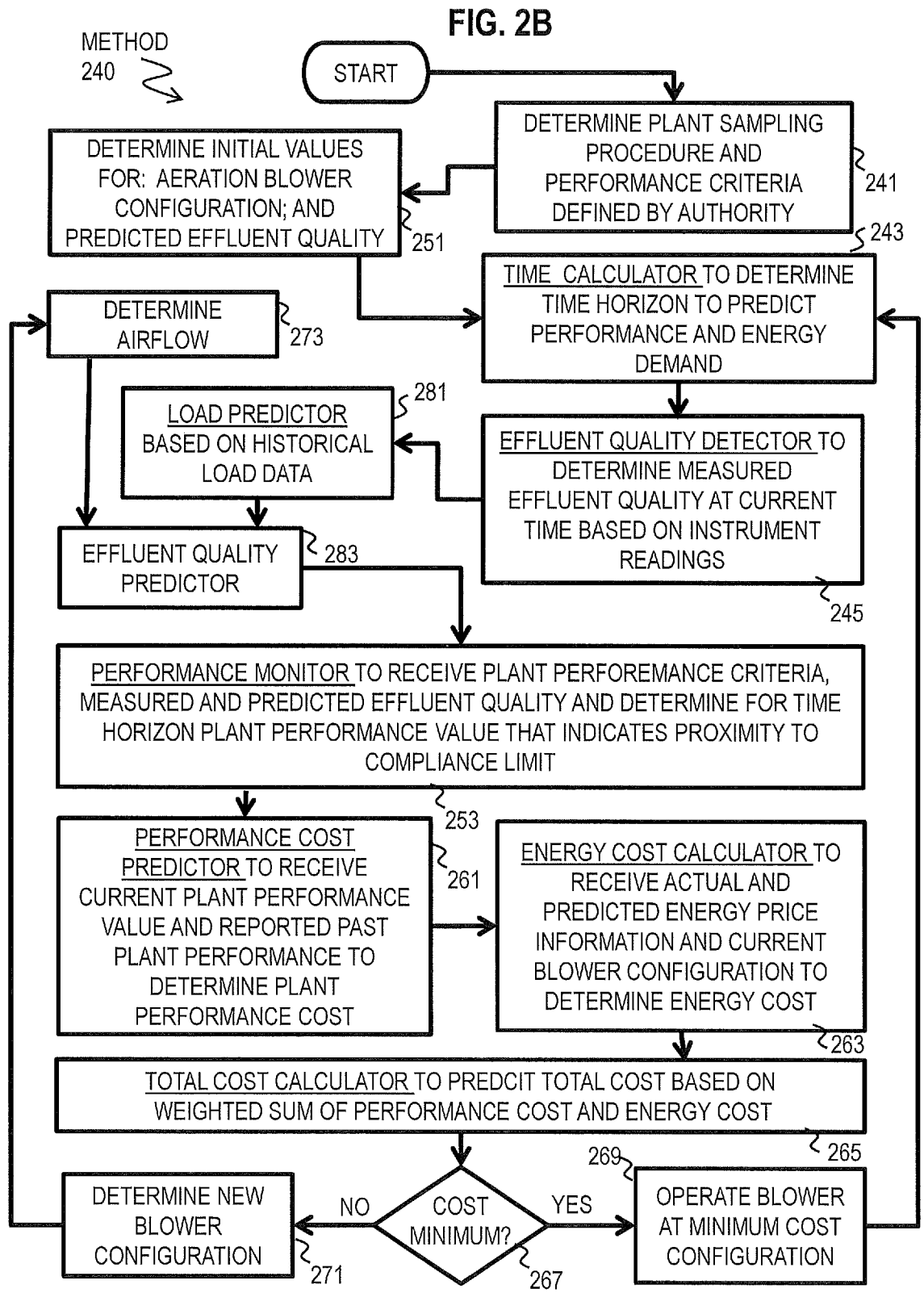
FIG. 2B is a block diagram that illustrates an example wastewater treatment method, according to another embodiment.

FIG. 2B is a block diagram that illustrates an example wastewater treatment method, according to another embodiment. In this embodiment, some functions of the method 200 are combined in different ways into different software modules, and some different functions are added or used instead of other functions of FIG. 2A.

In step 241, the plant sampling procedure and performance criteria defined by a regulatory authority are determined. For example, the regulatory requirement for reporting 24-hour average values of certain consent parameters (e.g., ammonia, total nitrogen) in eluent is entered into the system 100 by manual entry from an operator. The regulatory surveillance period is thus 24 hours in this example. In addition, step 241 includes the plant performance criteria describing the regulatory requirements on effluent water quality in an example 24-hour mixing sample. Those criteria include the limiting values on NH4—N, $N_{TOT}$, Ptotal, TSS, BOD; COD. if values for the water quality parameters are worse than those limiting values, increased effluent charges have to be paid. Step 241 is a particular embodiment of the step 201 described above with reference to FIG. 2A.

In step 251, initial values are set for parameters that are determined by iteration in the following steps. In this example embodiment, the initial values determined are an initial value for an aeration blower configuration and predicted effluent quality using that configuration. In some embodiments, the initial predicted effluent quality is the regulatory target quality, and the initial blower configuration is that output by any conventional algorithm to set the aeration to meet the regulatory target. As an initial value for the blower configuration, the current blower configuration is used in some embodiments. Step 251 is a particular embodiment of the step 213 described above with reference to FIG. 2A.

In step 243, a time horizon calculator module is invoked to determine the time horizon over which to predict plant performance and energy demand. The input is the plant sampling procedure produced during step 241 and the output is the time horizon to be considered in the following steps, such as the time remaining in the current surveillance period. Thus, the time horizon calculated is linked to the regulatory sampling procedure and surveillance period, e.g. if the regulatory sampling procedure is a 24-hour mixing sample and 8 hours of the surveillance period have already elapsed, then the time horizon is 24 h−8 h=16 h. Step 243 is a particular embodiment of the step 223 described above with reference to FIG. 2A.

In step 245, an effluent quality detector module is invoked to determine the measured effluent quality for the current surveillance period based on instrument readings during the elapsed portion of the period. The inputs are the process instrument readings analyzing effluent water quality for the consent parameters, e.g., using sensor set 173, during the elapsed portion of the current period. For example NH4—N, PO4—P, NO3—N values are measured from corresponding sensors 173. The outputs are the values indicating a statistic (e.g., average, or load volume weighted average) of the values of the consent parameters during the elapsed portion of the current surveillance period. Step 245 is a particular embodiment of the step 211 described above with reference to FIG. 2A.

In step 281, a load predictor module is invoked to determine predicted wastewater inflow load during the time horizon based on historical load data. Step 281 is a particular embodiment of a portion of step 227 described above with reference to FIG. 2A. The input is historical load data. The output is a predicted waste water inflow load into the waste water treatment plant as a function of time during the time horizon. Any method known may be used. As an example, the waste water inflow load might be predicted to be the same load situation as the day before or a week before, or the combination of both. Also other statistical tools including weather forecasts might be used to predict the waste water inflow load.

Figure 3A:
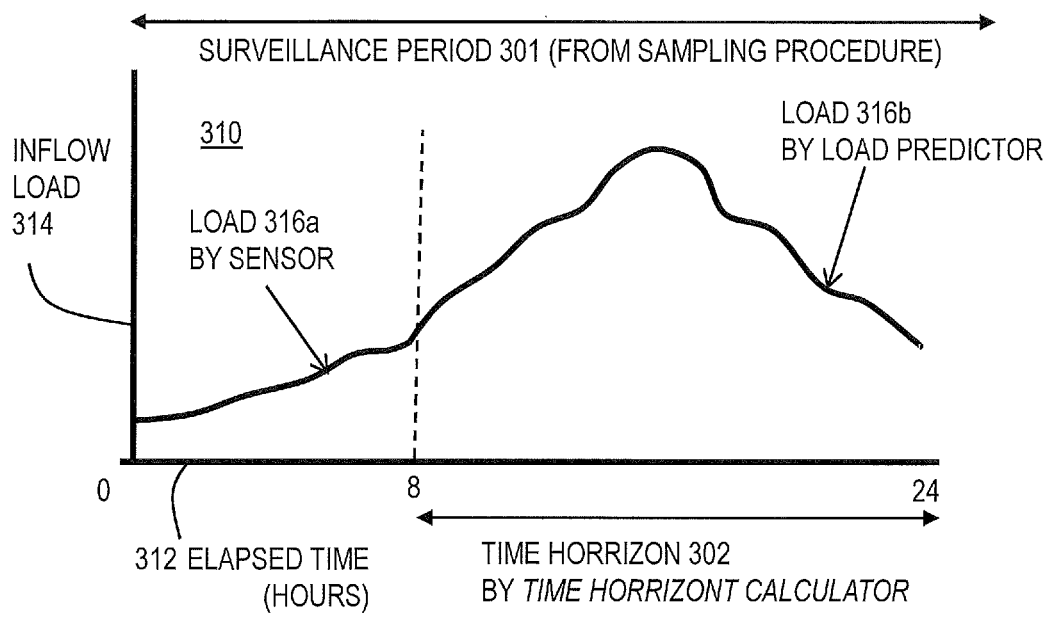
FIG. 3A through FIG. 3D are graphs that illustrate example time series of actual and predicted energy and performance parameters, according to an embodiment.

FIG. 3A through FIG. 3D are graphs that illustrate example time series of actual and predicted energy and performance parameters, according to an embodiment. FIG. 3A is a block diagram that illustrates an example inflow load graph 310 with a horizontal axis 312 that indicates time after start of a regulatory surveillance period 301 in hours. For purposes of illustration it is assumed that the current time is 8 hours after the start of the period, as indicated by the vertical dashed line. The time horizon 302 extends from the current time to the end of the current surveillance period. The vertical axis 314 indicates inflow load in arbitrary units. Trace 316*a* indicates the observed inflow load as determined by measurements (e.g. one or more sensors of sensor set 171) over the elapsed portion of the surveillance period 301. Trace 316*b* indicates the predicted inflow load through the time horizon, as determined during step 281 by the load predictor module.

Returning to FIG. 2B, in step 283, an effluent quality predictor module is invoked to determine predicted effluent water quality during the remaining time period. Step 283 is a particular embodiment of a portion of step 227 described above with reference to FIG. 2A. The inputs are: an inflow load prediction of the wastewater to be treated during the time interval from load predictor 281; and, the airflow to be delivered during the time period from the airflow calculator of step 273, described below, or the initial airflow based on the initial blower configuration determined during step 251.

The output is a predicted effluent water quality during the remaining time period for a target parameter such as $NH_4$—N and $N_{TOT}$. The calculations are based on a dynamical model describing biological waste water treatment processes (e.g., by the International Water Association (IWA) published Activated Sluge Model No. 1 (ASM1 model)). This prediction is then used as input to the performance monitor in step 253 for the next iteration in order to calculate the plant performance over the time horizon; and then to find the minimum cost blower configuration and air supply, as described in more detail below.

Figure 3B:
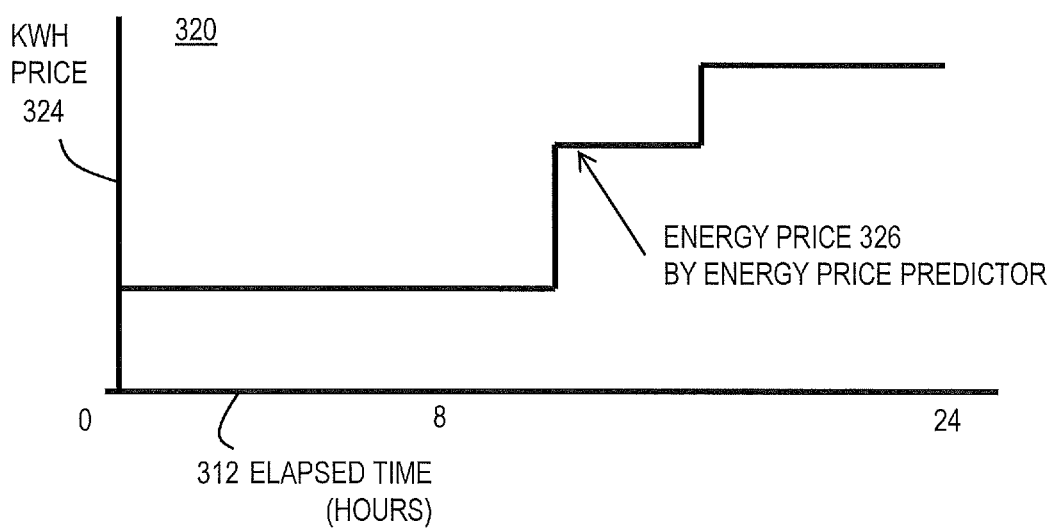
Figure 3C:
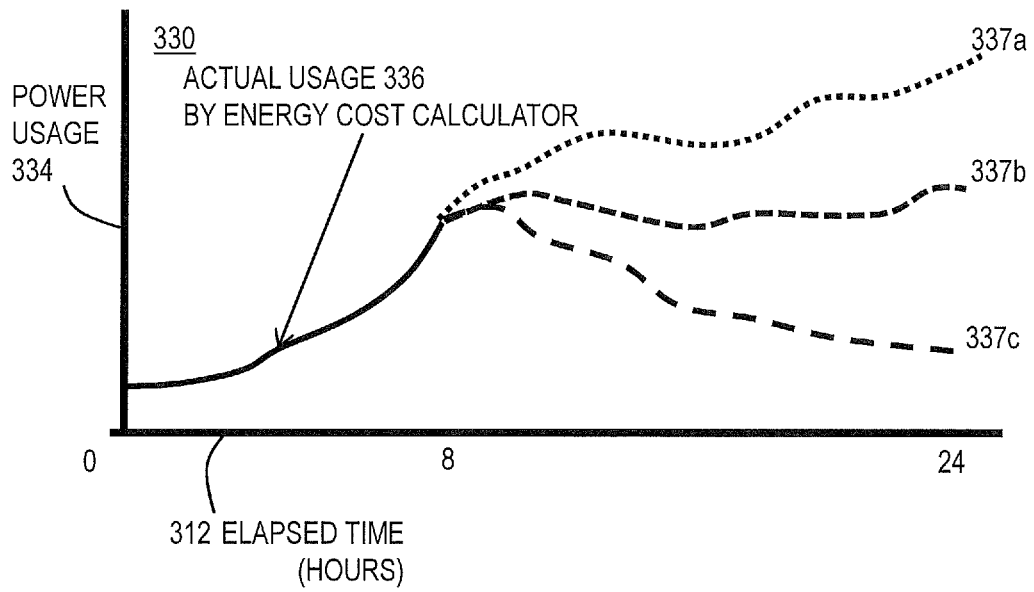
Figure 3D:
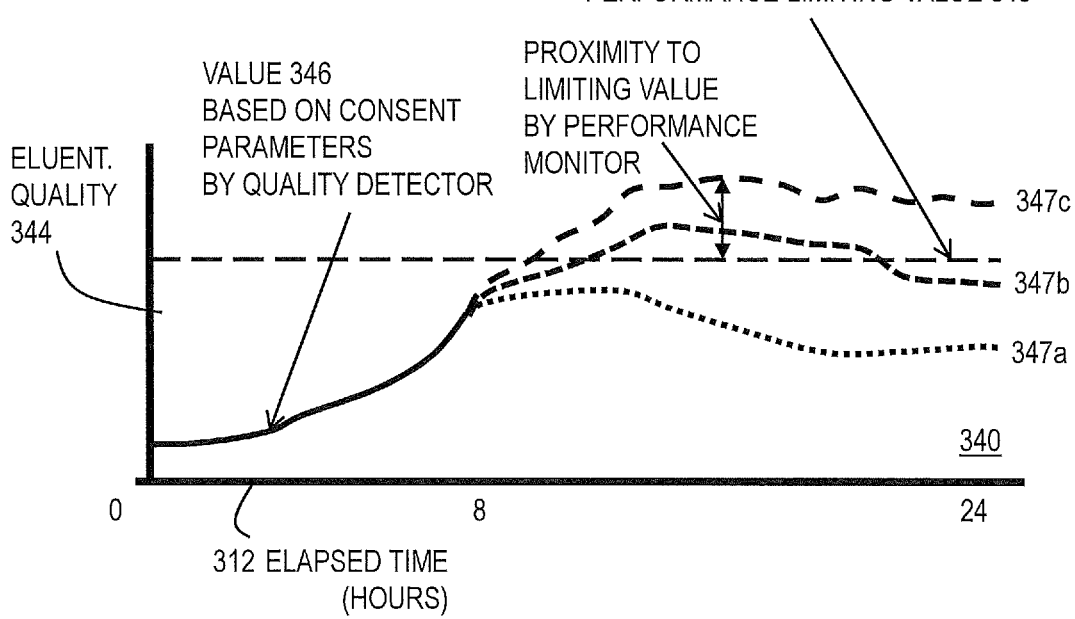

FIG. 3D is a block diagram that illustrates an example eluent graph 340 corresponding to the load of FIG. 3A. The horizontal axis 312 is the same as in FIG. 3A. The vertical axis 344 indicates eluent quality, e.g., as indicated by values of a consent parameter, in arbitrary units. The limiting value 345 for the consent parameter is indicated by the horizontal dashed line. Trace 346 indicates the observed eluent quality as determined by measurements (e.g. one or more sensors of sensor set 173) over the elapsed portion of the surveillance period. Trace 347a indicates the predicted average eluent quality from the start of the surveillance period to each time point through the time horizon, as determined during step 283 by the effluent quality predictor module. The other curves 347b and 347c show the predicted eluent quality for other blower configurations as described in more detail below.

Returning to FIG. 2B, in step 253, a performance monitor module is invoked to determine a plant performance value that indicates proximity to a compliance limit. For example, if the compliance limit is 2 milligrams (mg, 1 mg=$10^{-3}$ grams) per liter (l) for total nitrogen, and the predicted effluent value is 1.5 mg/l, then the difference 0.5 mg/l between those values is the proximity to compliance for that particular time and critical parameter. The inputs are: plant performance criteria; measured effluent water quality in the time so far elapsed during the current surveillance period; and, predicted effluent water quality in the time horizon, output by effluent quality predictor 283, described above. The plant performance criteria include the deviation between the limiting value for a consent parameter like $NH_4$—N and $N_{TOT}$ defined by regulation or internal customer requirements and the predicted value. The output of this monitor is predicted plant performance values over time within the current surveillance period. For example, the plant performance monitor determines the proximity of trace 347a to the performance limiting value 345. Step 253 is a particular embodiment of the step 227 described above with reference to FIG. 2A.

In step 261, a performance cost predictor module is invoked to determine the plant performance cost. The inputs are: the plant performance values for the current surveillance period output by the performance monitor 261 (e.g., trace 346 and 347a in a first iteration); and, general long term plant performance reporting (e.g., on an annual basis). The output is the plant performance cost, which quantifies the impact of operating the plant at the plant performance values predicted by the effluent quality predictor. The cost is a charge for the eluent and any enhanced charges for eluent that is worse than the regulatory limiting values and any other costs to penalize a violation, such as temporary or permanent closure of the facility. For the example initial trace 347a, assuming the limiting value 345 is a maximum allowed value, indicates predicted plant performance that would not be penalized, and so the performance cost is small, zero or negative in various embodiments. Step 261 is a particular embodiment of the step 231 described above with reference to FIG. 2A.

In step 263, an energy cost calculator module is invoked to predict the energy cost over the time horizon. The inputs are: an actual and predicted energy price during the time period from the energy provider, or information source, or based on historical data and correlations to the weather, or any other method known in the art; and, the current aeration blower configuration (the initial or iterated configuration). The output is energy cost to operate the aeration blower in the initial or iterated configuration over the time horizon. Step 263 is a particular embodiment of the steps 215 and 221 described above with reference to FIG. 2A.

FIG. 3B is a block diagram that illustrates an example energy cost 320 corresponding to the load of FIG. 3A. The horizontal axis 312 is the same as in FIG. 3A. The vertical axis 324 indicates energy cost in price per kilowatt hour. Trace 326 indicates the observed energy cost over the elapsed portion of the surveillance period (before 8 hours) at a low level, and the predicted energy cost at each time point through the time horizon, as determined during step 263 by the energy cost calculator module. FIG. 3C is a block diagram that illustrates an example power usage graph 330 corresponding to the load of FIG. 3A and the current blower configuration. The horizontal axis 312 is the same as in FIG. 3A. The vertical axis 334 indicates power usage in kilowatt hours. Trace 336 indicates the observed power usage as determined by measurements (e.g. one or more sensors of sensor set 172) over the elapsed portion of the surveillance period. Trace 337a indicates the predicted total energy usage from the start of the surveillance period to each time point through the time horizon, as determined during step 263 by the energy cost calculator module. The other curves 337b and 337c show the predicted total energy usage for other blower configurations as described in more detail below. The total energy cost is determined by multiplying the energy cost per kilowatt hour from trace 326 by the energy usage in kilowatt hours at each time point associated with trace 337a (or 337b and 337c for other lower configurations as described in more detail below).

Returning of FIG. 2B, in step 265, a total cost calculator module is invoked to determine the total of the performance cost and the energy cost over the time period. The inputs are: plant performance cost received from step 261; and, the energy cost for aeration when operating the plant at the initial or iterated blower configuration during the time horizon. This module considers plant specific weighting factors for the relative contributions of performance cost and energy costs to the total cost. The output is total cost to operate the aeration blower in the initial or iterated configuration. In an example embodiment, this is a sum of performance cost and energy cost. In some cases both costs might be weighted relative to each other. Step 265 is a particular embodiment of a portion of the step 233 described above with reference to FIG. 2A.

In step 267, a minimizer module is invoiced to determine whether the total cost is a minimum cost for the time period. Step 267 is a particular embodiment of steps 231 and 233 described above with reference to FIG. 2A. If not, control passes to step 271 to determine a new blower configuration and then to step 273 to determine a new airflow associated with the new blower configuration. Control then passes to step 283 and following to determine the total costs (weighted combination of energy cost and non-compliance costs) of the new blower configuration. In some embodiments, the total cost for a plurality of blower configurations is determined before it is determined whether a total cost minimum has been achieved. Thus, if total cost for only the first blower configuration has been computed, then the total cost minimum has not been determined and control passes to step 271 and following as described above. Step 267 is a particular embodiment of step 233 of FIG. 2A.

Any method may be used to determine a blower configuration associated with a minimum total cost. For example, the change from the total cost of a previous blower configuration to the total cost of a subsequent blower configuration is used with a gradient search, or simulated annealing is used to avoid local minimum of the gradient search, or a Monte Carlo approach to determine a new blower configuration. If a blower configuration is discovered associated with a minimum total cost, then the blower configuration associated with the minimum total cost should be used in the plant, and control passes to step 269. In step 269 the plant is operated with the blower configuration associated with the minimum total cost. Step 269 is a particular embodiment of step 235 described above with reference to FIG. 2A. Control passes to step 243 to calculate the next time period, described above, and following steps.

If the total cost is not a minimum for the time period, then a changed blower configuration should be determined and the changed costs determined in a next iteration. The output is a request for a change in blower configuration. Control passes to step 271 and following. In step 271, a blower configurator module is invoked to determine a blower configuration that either uses less energy (to decrease energy cost) or allows a higher airflow supply (to decrease performance costs) or some combination. Step 271 is a particular embodiment of a portion of step 225 described above with reference to FIG. 2A. The inputs are current blower configuration and airflow and total cost. The output is a new blower configuration.

In step 273, an airflow calculator module is invoked to determine an airflow for the new blower configuration. Step 273 is a particular embodiment of a portion of step 225 described above with reference to FIG. 2A. The inputs are the new blower configuration for the next iteration. The output is an airflow for the new blower configuration. Control then passes to step 283 and following steps, as described above.

3. Computational Hardware Overview

FIG. 4 is a block diagram that illustrates a computer system 400 upon which an embodiment of the invention may be implemented, such as a Supervisory Control And Data Acquisition (SCADA) system for a waste water treatment plant (WWTP). Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 400, or a portion thereof, constitutes a means for performing one or more steps of one or more methods described herein.

A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitutes computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 470 sends and receives electrical, acoustic or electromagnetic signals, including infrared and optical signals, that carry information streams, such as digital data.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 402, except for carrier waves and other signals.

Logic encoded in one or more tangible media includes one or both of processor instructions on a computer-readable storage media and special purpose hardware, such as ASIC 420.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, carry information to and from computer system 400. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a signal on a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to a signal on an infra-red a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

Figure 5:
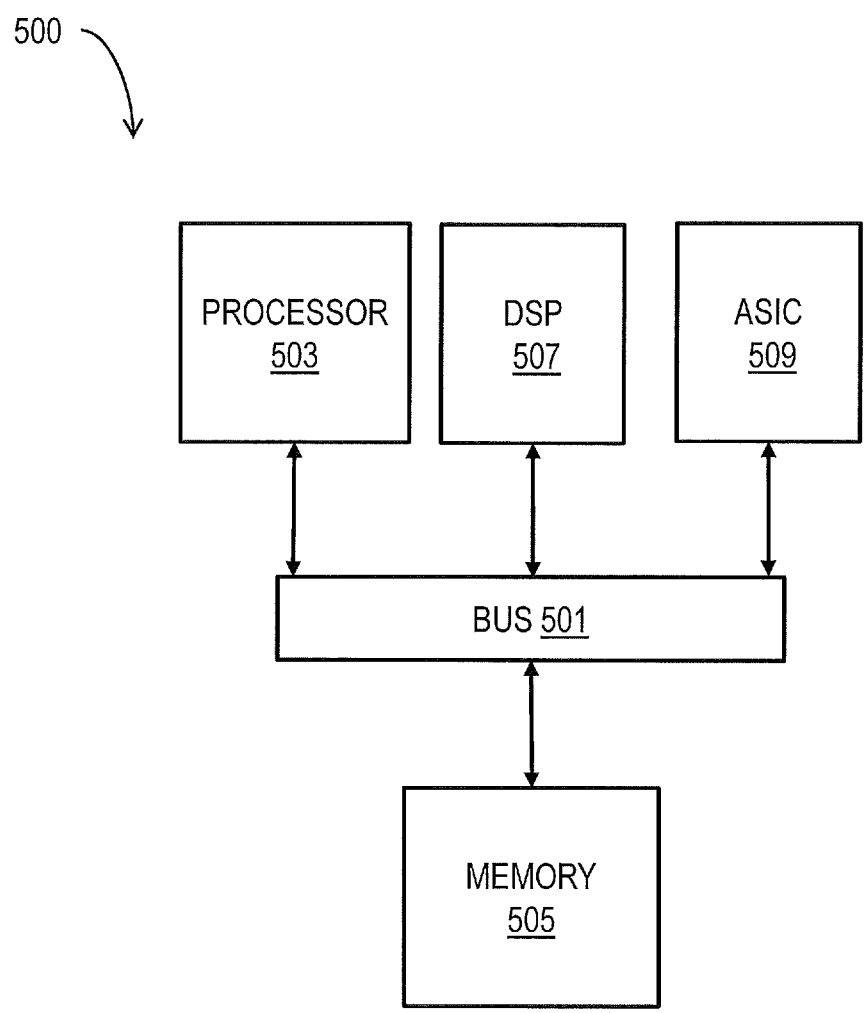
FIG. 5 illustrates a chip set upon which an embodiment of the invention may be implemented.

FIG. 5 illustrates a chip set 500 upon which an embodiment of the invention may be implemented, such as a Supervisory Control And Data Acquisition (SCADA) system for a waste water treatment plant (WWTP). Chip set 500 is programmed to perform one or more steps of a method described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 500, or a portion thereof, constitutes a means for performing one or more steps of a method described herein.

In one embodiment, the chip set 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 505 also stores the data associated with or generated by the execution of one or more steps of the methods described herein.

4. Extensions, Modifications and Alternatives.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   determining a first aeration intensity for a first aeration interval and a different second aeration intensity for a second aeration interval based on a current energy price, a predicted energy price, and a regulatory surveillance period during which a regulatory critical parameter is monitored for regulatory compliance, wherein the determining is based upon weighting factors influencing a total energy cost and a cost of deviating from a target of the regulatory critical parameter;
   aerating wastewater at the first aeration intensity for the first aeration interval, wherein the first aeration interval comprises an interval of high energy costs within the regulatory surveillance period and the first aeration intensity comprises an intensity resulting in a value of the critical parameter worse than a limiting value of the critical parameter, wherein the first aeration intensity is identified based upon a predicted purification performance of the first aeration intensity over the first aeration interval and determining an average of the first aeration intensity and the second aeration intensity will achieve compliance with the limiting value of the critical parameter; and
   aerating wastewater at the second aeration intensity for the second aeration interval, wherein the second aeration interval comprises an interval of low energy costs within the regulatory surveillance period and the second aeration intensity comprises an intensity resulting in a value of the critical parameter better than the limiting value of the critical parameter, wherein the second aeration intensity is identified based upon a predicted purification performance of the second aeration intensity over the second aeration interval;
   the first aeration intensity and the second aeration intensity being based upon determining an average of the first aeration intensity and the second aeration intensity will achieve compliance with the limiting value of the critical parameter;
   the first aeration interval being short compared to the regulatory surveillance period,
   the second aeration interval being short compared to the regulatory surveillance period and does not overlap the first aeration interval, and
   the first aeration intensity being less than the second aeration intensity and wherein the first aeration intensity and the second aeration intensity result in an average value of the critical parameter achieving compliance with the limiting value of the critical parameter within the regulatory surveillance period.

2. A method as recited in claim 1, wherein:
   the first aeration interval is a time interval associated with an actual or predicted first energy price; and,
   the second aeration interval is a time interval associated with a different actual or different predicted second energy price that is less than the first energy price.

3. A method as recited in claim 1, wherein the determining the first aeration intensity for the first aeration interval and the different second aeration intensity for the second aeration interval further comprises determining the first aeration intensity and the different second aeration intensity based on one or more of:
   historical plant purification data that indicates values for the treated effluent properties associated with aeration intensity;
   a monitoring procedure defined by the regulatory authority for determining any limiting value of the regulated critical parameter; and,
   aeration intensity calculated to meet the limiting value for the regulatory critical parameter.

4. A method as recited in claim 1, wherein determining the first aeration intensity for the first aeration interval and the different second aeration intensity for the second aeration interval further comprises determining the first aeration intensity and the different second aeration intensity based on a weighting factor that accounts for site specific conditions between energy usage and purification performance.

5. A method as recited in claim 1, wherein determining the first aeration intensity for the first aeration interval and the different second aeration intensity for the second aeration interval is repeated at a temporal period short compared to a temporal horizon to an end of the current regulatory surveillance period.

6. A method as recited in claim 1, wherein determining the first aeration intensity for the first aeration interval and the different second aeration intensity for the second aeration interval further comprises:
   determining the first aeration intensity based on a first set point value for the regulatory critical parameter worse than a fixed set point that satisfies the limiting value; and,
   determining the second aeration intensity based on a different second set point value for the regulatory critical parameter better than the fixed set point.

7. A non-transitory computer-readable medium carrying one or more sequences of instructions, wherein execution of the one or more sequences of instructions by one or more processors causes the one or more processors to perform the step of:
   determining a first aeration intensity for a first aeration interval and a different second aeration intensity for a second aeration interval based on a current energy price, a predicted energy price, and a regulatory surveillance period during which a regulatory critical parameter is monitored for regulatory compliance, wherein the determining is based upon weighting factors influencing a total energy cost and a cost of deviating from a target of the regulatory critical parameter,
   wherein aeration of wastewater is determined to occur at the first aeration intensity for the first aeration interval, wherein the first aeration interval comprises an interval of high energy costs within the regulatory surveillance period and the first aeration intensity comprises an intensity resulting in a value of the critical parameter worse than a limiting value of the critical parameter, wherein the first aeration intensity is identified based upon a predicted purification performance of the first aeration intensity over the first aeration interval and determining an average of the first aeration intensity and the second aeration intensity will achieve compliance with the limiting value of the critical parameter,
   aeration of wastewater is determined to occur at the second aeration intensity for the second aeration interval, wherein the second aeration interval comprises an interval of low energy costs within the regulatory surveillance period and the second aeration intensity comprises an intensity resulting in a value of the critical parameter better than the limiting value of the critical parameter, wherein the second aeration intensity is identified based upon a predicted purification performance of the second aeration intensity over the second aeration interval,
   the first aeration intensity and the second aeration intensity being based upon determining an average of the first aeration intensity and the second aeration intensity will achieve compliance with the limiting value of the critical parameter;
   the first aeration interval being short compared to the regulatory surveillance period,
   the second aeration interval being short compared to the regulatory surveillance period and does not overlap the first aeration interval, and
   the first aeration intensity being less than the second aeration intensity and wherein the first aeration intensity and the second aeration intensity result in an average value of the critical parameter achieving compliance with the limiting value of the critical parameter within the regulatory surveillance period.

8. A non-transitory computer-readable medium in claim 7, wherein:
   the first aeration interval is a time interval associated with an actual or predicted first energy price; and
   the second aeration interval is a time interval associated with a different actual or different predicted second energy price that is less than the first energy price.

9. A non-transitory computer-readable medium in claim 7, wherein determining the first aeration intensity for the first aeration interval and the different second aeration intensity for the second aeration interval further comprises determining the first aeration intensity and the different second aeration intensity based on one or more of:
   historical plant purification data that indicates values for the treated effluent properties associated with aeration intensity;
   a monitoring procedure defined by the regulatory authority for determining any limiting value of the regulated critical parameter; and,
   aeration intensity calculated to meet the limiting value for the regulatory critical parameter.

10. A non-transitory computer-readable medium in claim 7, wherein determining the first aeration intensity for the first aeration interval and the different second aeration intensity for the second aeration interval is repeated at a temporal period short compared to a temporal horizon to an end of the current regulatory surveillance period.

11. A non-transitory computer-readable medium in claim 7, wherein determining the first aeration intensity for the first aeration interval and the different second aeration intensity for the second aeration interval further comprises:
   determining the first aeration intensity based on a first set point value for the regulatory critical parameter worse than a fixed set point that satisfies the limiting value; and,
   determining the second aeration intensity based on a different second set point value for the regulatory critical parameter better than the fixed set point.

12. A system comprising:
   an aeration system configured to aerate wastewater at a controlled aeration intensity;
   at least one processor; and
   at least one memory including one or more sequences of instructions,
   the at least one memory and the one or more sequences of instructions configured to, with the at least one processor, cause the system to perform at least the following,
   determine a first aeration intensity for a first aeration interval and a different second aeration intensity for a second aeration interval based on a current energy price, a predicted energy price, and a regulatory surveillance period during which a regulatory critical parameter is monitored for regulatory compliance, wherein the determining is based upon weighting factors influencing a total energy cost and a cost of deviating from a target of the regulatory critical parameter;
   operate the aeration system to aerate wastewater at the first aeration intensity for the first aeration interval, wherein the first aeration interval comprises an interval of high energy costs within the regulatory surveillance period and the first aeration intensity comprises an intensity resulting in a value of the critical parameter worse than a limiting value of the critical parameter, wherein the first aeration intensity is identified based upon a predicted purification performance of the first aeration intensity over the first aeration interval and determining an average of the first aeration intensity and the second aeration intensity will achieve compliance with the limiting value of the critical parameter; and operate the aeration system to aerate wastewater at the second aeration intensity for the second aeration interval, wherein the second aeration interval comprises an interval of low energy costs within the regulatory surveillance period and the second aeration intensity comprises an intensity resulting in a value of the critical parameter better than the limiting value of the critical parameter, wherein the second aeration intensity is identified based upon a predicted purification performance of the second aeration intensity over the second aeration interval;

the first aeration intensity and the second aeration intensity being based upon determining an average of the first aeration intensity and the second aeration intensity will achieve compliance with the limiting value of the critical parameter;

wherein the first aeration interval is short compared to the regulatory surveillance period, the second aeration interval is short compared to the regulatory surveillance period and does not overlap the first aeration interval, and the first aeration intensity is less than the second aeration intensity and wherein the first aeration intensity and the second aeration intensity result in an average value of the critical parameter achieving compliance with the limiting value of the critical parameter within the regulatory surveillance period.

13. A system as recited in claim 12, wherein:
the first aeration interval is a time interval associated with an actual or predicted first energy price; and,
the second aeration interval is a time interval associated with a different actual or different predicted second energy price that is less than the first energy price.

14. A system as recited in claim 12, wherein the determining the first aeration intensity for the first aeration interval and the different second aeration intensity for the second aeration interval further comprises determining the first aeration intensity and the different second aeration intensity based on one or more of:
historical plant purification data that indicates values for the treated effluent properties associated with aeration intensity;
a monitoring procedure defined by the regulatory authority for determining any limiting value of the regulated critical parameter; and,
aeration intensity calculated to meet the limiting value for the regulatory critical parameter.

15. A system as recited in claim 12, wherein determining the first aeration intensity for the first aeration interval and the different second aeration intensity for the second aeration interval is repeated at a temporal period short compared to a temporal horizon to an end of the current regulatory surveillance period.

16. A system as recited in claim 12, wherein determining the first aeration intensity for the first aeration interval and the different second aeration intensity for the second aeration interval further comprises:
determining the first aeration intensity based on a first set point value for the regulatory critical parameter worse than a fixed set point that satisfies the limiting value; and,
determining the second aeration intensity based on a different second set point value for the regulatory critical parameter better than the fixed set point.

\* \* \* \* \*